United States Patent [19]

Cann et al.

[11] Patent Number: 4,892,853

[45] Date of Patent: Jan. 9, 1990

[54] ETHYLENE POLYMERIZATION CATALYST

[75] Inventors: Kevin J. Cann; Frederick J. Karol, both of Belle Mead, N.J.; Kiu H. Lee, South Charleston; Arthur E. Marcinkowsky, Charleston, both of W. Va.

[73] Assignee: Union Carbide Chemicals and Plastics Company Inc., Danbury, Conn.

[21] Appl. No.: 251,360

[22] Filed: Sep. 30, 1988

[51] Int. Cl.[4] ............................................... C08F 4/68
[52] U.S. Cl. ..................... 502/112; 502/119; 502/120; 502/123; 502/125; 502/126; 502/127; 502/128; 526/144
[58] Field of Search ............... 502/112, 119, 120, 123, 502/125, 126, 127, 128

[56] References Cited

U.S. PATENT DOCUMENTS

| | | | |
|---|---|---|---|
| 3,166,517 | 1/1965 | Ro | 502/128 |
| 4,295,991 | 10/1981 | Wristers | 502/123 X |
| 4,508,842 | 4/1985 | Beran | 502/112 |
| 4,607,019 | 8/1986 | Best | 502/119 |

*Primary Examiner*—Patrick P. Garvin
*Attorney, Agent, or Firm*—Saul R. Bresch

[57] ABSTRACT

A vanadium catalyst composition comprising:
  (i) the reaction product of a vanadium compound and an electron donor, which is a liquid, organic Lewis base in which the vanadium compound is soluble;
  (ii) a hydrocarbyl aluminum cocatalyst; and
  (iii) a promoter having the following formula:

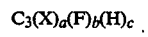

wherein X is chlorine, bromine, or iodine, and each X can be alike or different
  a = an integer from 6 to 8
  b = an integer from 0 to 2
  c = an integer from 0 to 2
  a + b + c = 8

18 Claims, No Drawings

ETHYLENE POLYMERIZATION CATALYST

TECHNICAL FIELD

This invention relates to a vanadium catalyst useful in ethylene polymerization.

BACKGROUND ART

A number of vanadium catalysts have been described in the literature based on species such as VCl$_4$, VOCl$_3$, VOCl$_3$, and vanadyl tris acetyl-acetonate. Impregnated on or chemically anchored to supports such as silica, these catalysts provide polyethylene with a broad molecular weight distribution and certain desirable properties. However, these catalyst systems are plagued by several problems, among them, low activity. Particularly in a gas phase process, high activity and hence low catalyst residues, obviating the need for removal, are desired.

Recently vanadium catalysts have come to the fore in polyethylene production because of the discovery of a particular catalyst composition, which is singularly effective in gas phase processes. The advantages of this catalyst composition are superior hydrogen response thus achieving very low levels of unsaturation in the polymer; a high degree of productivity resulting in very low catalyst residues; and the production of polyethylenes having a relatively broad molecular weight distribution and a wide melt index range. Further, they permit the utilization of a broad range of alpha-olefin co-monomers, which enables the production of a wide range of densities; and they provide polymers having high bulk densities and readily fluidizable particle sizes low in fines, substantially free of agglomeration.

The particular catalyst composition referred to comprises (i) the reaction product of a vanadium trihalide and an electron donor and a modifier impregnated onto a silica support; (ii) a halocarbon promoter; and (iii) a hydrocarbyl aluminum cocatalyst. The catalyst composition can be prepared as follows: the vanadium trihalide is first dissolved in the electron donor at a temperature in the range of about 20° C to below the boiling point of the electron donor for about 2 to about 6 hours. Silica is then added as a dry powder or as a slurry in the electron donor or an inert solvent whereupon the silica becomes impregnated with the vanadium trihalide/electron donor reaction product. The liquid is then removed by drying at less than 100° C for about 3 to about 6 hours. The modifier, dissolved in an inert solvent, is subsequently mixed with the impregnated carrier, and the liquid is removed by drying at a temperature of less than about 70° C for about 2 to about 4 hours. The halocarbon promoter and the hydrocarbyl aluminum cocatalyst are added to the supported catalyst either before and/or during polymerization.

Since its introduction into commerce, the art has sought to optimize this catalyst composition particularly with regard to its polymerization activity.

DISCLOSURE OF THE INVENTION

An object of the invention, therefore, is to enhance the polymerization activity of this vanadium catalyst composition. Other objects and advantages will become apparent hereinafter.

According to the present invention, then, a vanadium catalyst composition has been discovered having increased polymerization activity. The enhanced composition comprises:
(i) the reaction product of a vanadium compound and an electron donor, which is a liquid, organic Lewis base in which the vanadium compound is soluble;
(ii) a hydrocarbyl aluminum cocatalyst; and
(iii) a promoter having the following formula:

$$C_3(X)_a(F)_b(H)_c$$

wherein X is chlorine, bromine, or iodine,
and each X can be alike or different
a = an integer from 6 to 8
b = an integer from 0 to 2
c = an integer from 0 to 2
a + b + c = 8

DETAILED DESCRIPTION

The vanadium compound can be any one of the well known group of vanadium compounds used to form those complexes, which find use as catalyst precursors in polymerization processes. Examples are vanadium trihalides, vanadium tetrahalides, and vanadium oxyhalides. The halides are generally chlorides, bromides, or iodides, or mixtures thereof. Of these compounds VCl$_3$, VCl$_4$, and VOCl$_3$ can be mentioned. The vanadium acetylacetonates such as vanadyl triacetylacetonate are also useful. A typical vanadium based catalyst is described in U.S. Pat. No. 4,508,842, which is incorporated by reference herein.

The electron donor is a liquid, organic Lewis base in which the vanadium compound is soluble. It can be selected from the group consisting of alkyl esters of aliphatic and aromatic carboxylic acids, aliphatic ketones, aliphatic amines, aliphatic alcohols, alkyl and cycloalkyl ethers, and mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of vanadium compound and electron donor, the reaction product finally contains about 1 to about 20 moles of electron donor per mole of vanadium compound and preferably about 1 to about 10 moles of electron donor per mole of vanadium compound. About 3 moles of electron donor per mole of vanadium compound has been found to be most preferable.

A conventional inorganic support for the catalyst, preferably silica, can be used if desired. The support is a solid, particulate porous material essentially inert to the polymerization. It is used as a dry powder having an average particle size of about 10 to about 250 microns and preferably about 30 to about 100 microns; a surface area of at least about 3 square meters per gram and preferably about 50 square meters per gram; and a pore size of at least about 80 Angstroms and preferably at least about 100 Angstroms. Generally, the amount of support used is that which will provide about 0.05 to about 0.55 millimole of vanadium compound per gram of support and preferably about 0.2 to about 0.35 millimole of vanadium compound per gram of support.

The promoter has the following formula:

$$C_3(X)_a(F)_b(H)_c$$

wherein X is chlorine, bromine, or iodine, and
each X can be alike or different
a = an integer from 6 to 8
b = an integer from 0 to 2
c = an integer from 0 to 2
a+b+c = 8.

The promoter can be, for example, hexachloropropane, heptachloropropane, or octachloropropane, and is prepared by conventional techniques. It can be impregnated into the support during the preparation of the precursor, i.e, component (i); mixed with the support after the precursor has been impregnated into the support either by adding to a slurry, which contains the supported precursor or by dry blending with the addition of heat; added after the modifier (discussed below); or fed separately to the reactor. In the former case, the promoter is dissolved in an inert hydrocarbon solvent such as isopentane and becomes an integral part of the supported precursor.

The precursor can, for example, be slurried in mineral oil to which the promoter is added or the promoter can be added to the catalyst precursor when it is in the mud stage.

The mole ratio of promoter to vanadium is preferably in the range of about 1:1 to about 4:1. These molar ratios are significantly lower than the mole ratios for other conventional promoters regardless of their volatility properties. By reducing the overall amount of halide entering the polymerization process, the overall halide content of the resin is also reduced. The preferred molar ratio is particularly advantageous at a reactor temperature of about 85° C.

The hydrocarbyl aluminum cocatalyst can be represented by the formula $R_3Al$ wherein each R is an alkyl radical; each R can be alike or different; and each R has 1 to 14 carbon atoms, and preferably 2 to 8 carbon atoms. Further, each alkyl radical can be a straight or branched chain. Examples of suitable radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5 dimethylhexyl, nonyl, decyl, isodecyl, undecyl, and dodecyl.

Examples of suitable hydrocarbyl aluminum compounds are as follows: triisobutylaluminum, trihexylaluminum, di-isobutylhexylaluminum, isobutyl dihexylaluminum, trimethylaluminum, triethylaluminum, tripropylaluminum, triisopropylaluminum, tri- n-butylaluminum, trioctyaluminum, tridecylaluminum, tridodecylaluminum, tribenzylaluminum, triphenylaluminum, trinaphthylaluminum, and tritolylaluminum. The preferred hydrocarbyl aluminums, are triethylaluminum, triisobutylaluminum, and trihexylaluminum.

The cocatalyst can be added to the supported vanadium complex either before or during the polymerization reaction. It can be added together or separately, simultaneously or sequentially. The cocatalyst is preferably added separately as a solution in an inert solvent, such as isopentane, to the polymerization reactor at the same time as the flow of ethylene is initiated. The cocatalyst is necessary to obtain any significant polymerization. About 5 to about 500 moles, and preferably about 10 to about 40 moles, of cocatalyst can be used per mole of vanadium catalyst, i.e., the reaction product of the vanadium compound and the electron donor.

A modifier can be included in the catalyst composition provided that the vanadium based precursor is supported. The formula of the modifier is $BX_3$ or $AlR_{(3-a)}X_a$ wherein each R is an alkyl radical having 1 to 14 carbon atoms and is alike or different; X is chlorine, bromine, or iodine, or mixtures thereof; and a is 0, 1, or 2. Preferred modifiers include alkylaluminum mono- and di-chlorides wherein each alkyl radical has 1 to 6 carbon atoms, and boron trichloride. A particularly preferred modifier is diethyl aluminum chloride. About 0.1 to about 10 moles, and preferably about 0.2 to about 2.5 moles, of modifier are used per mole of electron donor. When the modifier is used it is considered to be part of the vanadium compound/electron donor complex. The modifier can be added to the vanadium compound with the electron donor or to the supported precursor in a hydrocarbon solvent.

The supported catalyst is typically prepared as follows: silica gel is activated at a temperature in the range of about 250° C to about 800° C under a dry, inert gas such as nitrogen for about 8 to about 16 hours to give a support essentially free of adsorbed water and containing less than about 0.7 millimole per gram of silica of surface hydroxy groups. The silica and promoter are slurried in freshly distilled tetrahydrofuran (THF), under nitrogen. An amount of $VCl_3$ is added to give a loading of about 0.2 to about 0.35 millimole of vanadium per gram of support. The mixture is stirred for about 20 to about 40 minutes, then excess THF is removed to give a free flowing powder. If diethylaluminum chloride (DEAC) modification is desired, the dry catalyst is slurried in dry, deoxygenated hexane. DEAC is added, and, after stirring for about 20 to about 30 minutes, the hexane is removed to give a free flowing powder.

The ethylene polymerization can be conducted in the gas phase or liquid phase using conventional techniques such as fluidized bed, slurry, or solution processes. A continuous, fluidized bed process is preferred. Using this fluidized bed process, the supported vanadium complex together with the promoter, the cocatalyst, the ethylene monomer, and any comonomers are continuously fed into the reactor and polyethylene product is continuously removed. The density of the ethylene copolymer produced may be varied over a wide range depending upon the amount of alpha-olefin comonomer added and upon the particular comonomer employed. The greater the mole percent of alpha-olefin, the lower the density.

The fluidized bed polymerization is conducted at a temperature below the sintering temperature of the product. The operating temperature is generally in the range of about 10° C to about 115° C. Preferred operating temperatures will vary depending upon the density desired. High density polyethylenes of greater than about 0.94 grams per cubic centimeter (g/cc) are produced at operating temperatures of about 85° C to about 115° C, and preferably about 90° C to about 100° C. Low density polyethylenes ranging in density from about 0.91 to about 0.94 g/cc are preferably produced at an operating temperature of about 75° C to about 90° C. Very low density polyethylenes of less than about 0.91 g/cc are preferably produced at an operating temperature of about 10° C to about 80° C. In the case of very low density polyethylenes, it is necessary to dilute the reaction mixture with a large quantity of diluent gas in order to prevent the formation of polymer agglomerates and sustain polymerization on a continuous basis.

The fluidized bed reactor is typically operated at pressures of up to about 1,000, and preferably about 50 to about 350, psig.

A chain transfer agent, such as hydrogen, can be used to terminate the polymer chain. Usually the ratio of hydrogen to ethylene will vary between about 0.001 to about 2.0 moles of hydrogen per mole of ethylene.

Some advantages of the catalyst composition are as follows:

(i) improved reactor operability;
(ii) improved catalyst activity;
(iii) better control of both the catalyst composition and the reaction rate kinetics profile thus minimizing the formation of agglomerates and sheets;
(iv) avoidance of localized hot spots, erratic kinetics, and lumps;
(v) high resin production rates at 85° C and 100° C reaction temperatures;
(vi) particularly useful in the manufacture of high density polyethylene; linear low density polyethylene; very low density polyethylene; ethylene/propylene rubbers; and ethylene/propylene/diene monomer rubbers;
(vii) reduction in static generation;
(viii) better overall control of component feed rates together with uniformity of process and resin product; and
(ix) permits the polymerization process to be run at very high space-time yields.

Subject catalyst and its preparation are closely related to the catalyst described in U.S. Pat. No. 4,508,842 issued on April 2, 1985, which is incorporated by reference herein.

The invention is illustrated by the following examples:

EXAMPLES 1 to 3

VCl$_3$ solution is added to a slurry of silica in THF and then dried at 45° C until free-flowing to provide the supported precursor. The precursor is slurried in isopentane with DEAC and dried at 45° C until free-flowing. Heptachloropropane is initially dissolved in isopentane to provide solutions containing either (i) 13 percent by weight heptachloropropane and 87 percent by weight isopentane or (ii) 7 percent by weight heptachloropropane and 93 percent by weight isopentane. The supported precursor is added to the first solution in an amount sufficient to provide a molar ratio of heptachloropropane to vanadium of 4 and to the second solution in on amount sufficient to provide a molar ratio of heptachloropropane to vanadium of 2. After a mixing period of about 30 minutes, the isopentane is flashed off at 40° C following which the free flowing supported catalyst precursor/promoter is collected and stored.

The supported catalyst precursor/promoter is added to the reactor as a dry powder while the cocatalyst is added as a solution in hexane. The supported catalyst precursor is fed at a rate of 2.94 grams per hour (this weight does not include the weight of the promoter). 220 pounds per square inch of ethylene and 10.5 pounds per square inch of hydrogen is also introduced into the reactor. An amount of catalyst sufficient to give a charge of 0.88 millimole of vanadium is used. 1 hexene is introduced into the reactor in each example. The molar ratio of 1 hexene to ethylene is 0.0085:1. The balance of the gas is nitrogen. 49.2 equivalents of cocatalyst are used per equivalent of vanadium. The temperature in the reactor is maintained at 85° C and the residence time in the reactor is 4.26 hours.

Variables and results are set forth in the Table I.

Notes with respect to Table I:
1. DEAC=diethylaluminum chloride.
2. THF=tetrahydrofuran
3. psia=pounds per square inch absolute
4. nitrogen is given in percent by volume based on the total volume of the reactor.
5. production rate is the pounds per hour of resin produced.
6. space/time/yield is given in pounds per hour per cubic foot.
7. TEAL=triethylaluminum
8. TIBA=triisobutyluminum
9. amount of cocatalyst s in percent by weight based on the weight of the isopentane solution.
10. the cocatalyst solution feed rate is given in cubic centimeters per hour.
11. rpm=revolutions per minute.
12. melt index: ASTM D-1238, Condition E. Measured at 190° C and reported as decigrams per 10 minutes.
13. melt flow ratio: ratio of flow index to melt index. flow index: ASTM D-1238, Condition F. Measured at 10 times the weight used in the melt index test above.
14. polymer density: ASTM D 1505 procedure is followed. Measurement for density is then made in a density gradient column and density values are reported as gram per cubic centimeter.
15. ppm=parts per million by weight.
16. weight percent of total ash is based on the weight of the resin.
17. bulk density: ASTM D 1895, Method B. The resin is poured via a ⅜ inch diameter funnel into a 400 milliliter graduated cylinder to the 400 milliliter line without shaking the cylinder, and weighed by difference. Density values are reported as pounds per cubic foot.
18. the fines are the percentage of resin passing through a 120 mesh screen.
19. catalyst productivity is measured as pounds of resin per pound of supported precursor+DEAC.

TABLE I

| | Example | 1 | 2 | 3 |
|---|---|---|---|---|
| 1. | molar ratio of heptachloropropane to vanadium | 4 | 4 | 2 |
| 2. | millimole of vanadium per gram of support | 0.3 | 0.3 | 0.3 |
| 3. | molar ratio of DEAC to vanadium | 1.6 | 1.6 | 1.6 |
| 4. | weight percent of aluminum based on weight of supported precursor/promoter | 1.32 | 1.32 | 1.32 |
| 5. | weight percent of THF based on weight of supported precursor/promoter | 7.35 | 7.35 | 7.35 |
| 6. | reactor temperature (°C.) | 85 | 85 | 85 |
| 7. | reactor pressure (psia) | 315 | 315 | 315 |
| 8. | molar ratio of hydrogen to ethylene | 0.048 | 0.049 | 0.044 |
| 9. | molar ratio of 1-hexene to ethylene. | 0.0085 | 0.0085 | 0.009 |
| 10. | ethylene (psia) | 220 | 219 | 217 |
| 11. | nitrogen (%) | 24 | 24 | 25 |
| 12. | production rate (lbs/hr) | 23.5 | 22 | 21.8 |
| 13. | space/time/yield (lbs/hr/cu ft) | 5.3 | 4.6 | 5.0 |
| 14. | cocatalyst | TEAL | TIBA | TEAL |
| 15. | cocatalyst (% by wt) | 2.63 | 5 | 2.63 |

TABLE I-continued

| Example | 1 | 2 | 3 |
|---|---|---|---|
| 16. cocatalyst solution feed rate (cc per hr) | 300 | 285 | 280 |
| 17. catalyst feeder (rpm) | 250 | 225 | 300 |
| resin properties | | | |
| 18. melt index (dg/min) | 0.30 | 0.32 | 0.33 |
| 19. flow index (dg/min) | 31.1 | 30.5 | 32 |
| 20. melt flow ratio | 102 | 98 | 97 |
| 21. polymer density (g/cc) | 0.952 | 0.952 | 0.953 |
| 22. residual vanadium (ppm) | 4.3 | 4.6 | 5.2 |
| 23. total ash (wt %) | 0.039 | 0.045 | 0.043 |
| 24. bulk density (lbs/cu ft) | 19.2 | 19.6 | 19.8 |
| 25. average particle size (inch) | 0.031 | 0.029 | 0.03 |
| 26. fines (%) 120 mesh | 2.4 | 1.3 | 1.7 |
| 27. catalyst productivity | 3600 | 3400 | 3000 |

EXAMPLES 4 to 13

To a one liter stirred reactor is added 500 cubic centimeters of dry degassed hexane and twenty cubic centimeters of 1-hexene. Into a 125 cubic centimeter sample bottle is charged 100 cubic centimeters of hexane under nitrogen followed by the vanadium based catalyst, the cocatalyst, and then the promoter. The contents of the sample bottle are transferred to the reactor under nitrogen pressure, and the reactor is heated to 70° C. The reactor is charged with hydrogen to one pound per square inch gauge (psig) followed by ethylene at a total reactor pressure of 160 psig. The reaction is run to 85° C for 30 minutes.

| Catalyst description: | |
|---|---|
| millimole of vanadium per gram of support | 0.26 |
| molar ratio of diethylaluminum chloride to vanadium | 4.5 |
| weight percent of aluminum per gram of total catalyst | 2.97 |
| weight percent tetrahydrofuram | 6.2 |

Co-catalyst=40 equivalents of triethylaluminum to vanadium

Promoter is added separately to the sample bottle. Variables and results are set forth in Table II.

Notes with respect to Table II:

1. The activity is given in grams of polyethylene per millimole of vanadium per hour per 100 psi of ethylene.

2. The melt index, flow index, melt flow ratio, and polymer density are defined as for Table I.

TABLE II

| Example | Promoter | Promoter/V Molar Ratio | Activity | Melt Index | Flow Index | Melt Flow Ratio | Polymer Density (g/cc) |
|---|---|---|---|---|---|---|---|
| 4 | hexachloropropane | 2 | 1907 | 4.30 | 245 | 57 | 0.9511 |
| 5 | heptachloropropane | 4 | 3911 | 1.41 | 93 | 66 | 0.9466 |
| 6 | heptachloropropane | 2 | 3938 | 5.85 | 342 | 59 | 0.9513 |
| 7 | heptachloropropane | 1 | 2913 | 23.00 | 905 | 39 | 0.9540 |
| 8 | octachloropropane | 4 | 3245 | 3.34 | 196 | 59 | 0.9482 |
| 9 | octachloropropane | 2 | 4085 | 5.91 | 328 | 56 | 0.9477 |
| 10 | octachloropropane | 1 | 3257 | 4.24 | 222 | 52 | 0.9496 |
| 11 | chloroform | 5 | 1355 | 5.23 | 277 | 53 | 0.9509 |
| 12 | chloroform | 2 | 801 | 2.45 | 158 | 64 | 0.9543 |
| 13 | chloroform | 1 | 729 | 1.18 | 86 | 73 | 0.9525 |

We claim:

1. A vanadium catalyst composition comprising:
  (i) the reaction product of a vanadium compound and an electron donor, which is a liquid, organic Lewis base in which the vanadium compound is soluble;
  (ii) a hydrocarbyl aluminum cocatalyst; and
  (iii) a promoter having the following formula;

$$C_3(X)_a(F)_b(H)_c$$

where X is chlorine, bromine, or iodine, and each X can be alike or different
a=an integer from 6 to 8
b=an integer from 0 to 2
c=an integer from 0 to 2
a+b+c=8
and wherein the molar ratio of promoter to vanadium has an upper limit of about 4:1, said composition exhibiting enhanced catalytic activity in the polymerization of ethylene alone or together with one or more other alpha olefins.

2. The vandium catalyst composition of claim 1 wherein the molar ratio of promoter to vanadium is in the range of about 1:1 to about 4:1.

3. The vanadium catalyst composition of claim 1 wherein the Lewis base is an alkyl ester of an aliphatic or aromatic carboxylic acid, an aliphatic ketone, an aliphatic amine, an aliphatic alcohol, an alkyl or cycloalkyl ether, or a mixture thereof.

4. The vanadium catalyst composition of claim 1 wherein the vanadium compound is a halide, an oxyhalide, or an acetylacetonate.

5. The vanadium catalyst composition of claim 1 wherein the vanadium compound is a trihalide, a tetrahalide, or a trioxyhalide, said halide being a chloride, bromide, iodide, or mixtures thereof.

6. The vanadium catalyst composition of claim 1 wherein the vanadium compound is an acetylacetonate.

7. The vanadium catalyst composition of claim 1 wherein the cocatalyst is triisobutyl aluminum.

8. The vanadium catalyst composition of claim 1 wherein the oocatalyst is triethylaluminum.

9. The vanadium catalyst composition of claim 1 wherein component (i) is impregnated into an anic support.

10. The vanadium catalyst composition of claim 9 and a modifier of the formula $BX_3$ or $AlR_{(3-a)}X_a$ wherein each R is an alkyl radical having 1 to 14 carbon atoms and is alike or different; each X is individually chlorine, bromine, or iodine; and a is 0, 1, or 2.

11. The vanadium catalyst composition of claim 9 wherein the support is a silica support.

12. The vanadium catalyst composition of claim 2 wherein the cocatalyst is triisobutyl aluminum.

13. The vanadium catalyst composition of claim 2 wherein the cocatalyst is triethylaluminum.

14. The vanadium catalyst composition of claim 10 wherein the modifier is diethylaluminum chloride.

15. The vanadium catalyst composition of claim 10 wherein the modifier is present in an amount of about 0.1 to about 10 moles per mole of electron donor.

16. The vanadium catalyst composition of claim 15 wherein the modifier is present in an amount of about 0.2 to about 2.5 moles per mole of electron donor.

17. The vanadium catalyst composition of claim 2 wherein component (i) is impregnated into an inorganic support.

18. The vanadium catalyst composition of claim 17 wherein the support is a silica support.

* * * * *